United States Patent
Tozawa (10) Patent No.: US 6,761,617 B2
(45) Date of Patent: Jul. 13, 2004

(54) METHOD AND APPARATUS FOR MACHINING JOINT FACE OF WORK

(75) Inventor: Takahiro Tozawa, Minamitsuru-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 10/257,550

(22) PCT Filed: Feb. 22, 2002

(86) PCT No.: PCT/JP02/01631
§ 371 (c)(1), (2), (4) Date: Oct. 15, 2002

(87) PCT Pub. No.: WO02/070196
PCT Pub. Date: Sep. 12, 2002

(65) Prior Publication Data
US 2003/0126727 A1 Jul. 10, 2003

(30) Foreign Application Priority Data
Mar. 1, 2001 (JP) ........................................ 2001-057266

(51) Int. Cl.[7] .............................................. B24B 49/00
(52) U.S. Cl. .............................. 451/11; 451/5; 451/215
(58) Field of Search ................................ 451/10, 11, 5, 451/127, 215, 24, 340, 26

(56) References Cited
U.S. PATENT DOCUMENTS 4,735,019 A * 4/1988 Wiederkehr ................. 451/340
5,503,589 A * 4/1996 Wikle ............................ 451/5
5,690,542 A   11/1997 Ikemoto
5,738,564 A * 4/1998 Helle et al. .................... 451/11
6,224,462 B1 * 5/2001 Yokoyama et al. ........... 451/10

FOREIGN PATENT DOCUMENTS

JP  60155310       8/1985
JP  01135407 A     5/1989
JP  04183569       6/1992

* cited by examiner

Primary Examiner—Dung Van Nguyen
(74) Attorney, Agent, or Firm—Paul & Paul (57) ABSTRACT

The present invention relates to a method and an apparatus for machining a join surface of a workpiece, and solves the problem of the leakage attributable to the streaks formed by the abrasive grains thereby to provide the join surface having a high hermetic property.

In order to solve this problem, according to the present invention, the join surface (15) of a workpiece (31) is machined by the grinding process which includes the steps of applying a grinding tool (11) adapted to rotate about the rotation axis (33, 35) substantially parallel to the join surface (15) to the join surface (15) of the workpiece (31) to be machined, and providing the relative feeding movement in the direction substantially along the outline shape of the area of the join surface (15) between the grinding tool (11) and the workpiece (31), while controlling the direction of the grinding tool (11) or the workpiece (31) such that the direction of the rotation axis (33, 35) of the grinding tool (11) is substantially orthogonal to the direction of the relative feeding movement.

8 Claims, 7 Drawing Sheets

METHOD AND APPARATUS FOR MACHINING JOINT FACE OF WORK

TECHNICAL FIELD

The present invention relates to a method and an apparatus for machining a join surface of a workpiece having the join surface.

BACKGROUND ART

In joining two members, there is a case where it is necessary to closely attach the surfaces of members made of metal, or the like, to each other or with a rubber seal or a gasket interposed between the two members. In such a case, the join surfaces are generally finished by grinding using a surface grinding machine or a rotary grinding machine.

The use of a grinding tool such as a grinding stone, however, forms fine streaks, on the order of micrometer, called cutter marks or grinding surface marks on the join surface along the direction in which the abrasive grains move.

A vacuum container, called a "chamber" and used in a system for fabricating semiconductors or liquid crystal devices, requires a high hermetic property of the join surfaces between the lid and the body of the container. The join surfaces requiring such a high hermetic property are generally sealed with such a seal element as a rubber seal or gasket to prevent leakage.

It has been found that join surfaces finished by grinding in the prior art develops leakage due to the fine streaks described above even in the case where a seal element is used. The streaks caused by the abrasive grains are usually of a size on the order of micrometer and therefore are difficult to completely fill up with the seal. In the presence of a streak providing communication with the interior and the exterior of the container, therefore, a leak is caused.

Specifically, the streaks formed by abrasive grains, if some of them extend in such a direction as to establish communication between the interior and the exterior of the container, are so fine that they cannot be completely filled up with a seal element or the like, resulting in leakage along the streaks.

SUMMARY OF THE INVENTION

Accordingly, it is an object of the present invention to provide a method and an apparatus for machining a join surface, by which the leakage attributable to the streaks formed by the abrasive grains is eliminated to provide a highly hermetic join surface.

In view of the object described above, the present invention is characterized in that the grinding process is performed using a grinding tool such that the direction of the fine streaks formed by the abrasive grains substantially coincides with the direction along the outline shape or the outer periphery shape of the area defining the join surface.

Specifically, according to a first aspect of the present invention, there is provided a method, for machining a join surface of a workpiece, which includes the steps of: providing a grinding tool having a rotation axis substantially parallel to the join surface and adapted to rotate about the rotation axis; applying the grinding tool to the join surface of the workpiece to be machined; and grinding the join surface of the workpiece so as to form grinding streaks on the join surface in the direction substantially along the outline shape of the join surface area.

According to a second aspect of the present invention, there is provided a method, for machining a join surface of a workpiece, which includes the steps of: providing a grinding tool having a rotation axis substantially parallel to the join surface and adapted to rotate about the rotation axis; applying the grinding tool to the join surface of the workpiece to be machined; and grinding the join surface of the workpiece by providing the relative feeding movement in a direction substantially along the outline shape of the join surface area between the grinding tool and the workpiece while controlling the direction of the grinding tool or the workpiece such that the direction of the rotation axis of the grinding tool is substantially orthogonal to the direction of the relative feeding movement.

According to a third aspect of the present invention, there is provided an apparatus, for machining a join surface of a workpiece, which includes a spindle having a machining tool removably mounted thereon; a table having the workpiece mounted thereon; a linear feeding mechanism for moving the spindle and the table relatively to each other along the three orthogonal X-, Y- and Z-axes; a rotation mechanism for moving the spindle or the table in the direction along the C-axis as a rotative movement about the Z-axis; a grinding tool having a rotation axis substantially parallel to the join surface and mounted as a machining tool on the spindle to rotate around the rotation axis; and a numerical control unit for controlling the linear feeding mechanism and the rotation mechanism such that the grinding tool forms grinding streaks on the join surface in the direction substantially along the outline shape of the join surface area.

According to a fourth aspect of the present invention, there is provided an apparatus for machining a join surface of a workpiece, which includes a spindle having a machining tool removably mounted thereon; a table having the workpiece mounted thereon; a linear feeding mechanism for moving the spindle and the table relatively to each other along the three orthogonal X-, Y- and Z-axes; a rotation mechanism for moving the spindle or the table along the C-axis as a rotative movement about Z-axis; a grinding tool having a rotation axis substantially parallel to the join surface and mounted as a machining tool on the spindle to rotate about the rotation axis; and a numerical control unit for providing the cut-in movement along the Z-axis and the relative feeding movement along the X- and Y-axes in a direction substantially along the outline shape of the join surface area between the grinding tool and the workpiece while controlling the feeding movement along the C-axis such that the direction of the rotation axis of the grinding tool is substantially orthogonal to the direction of the relative feeding movement.

In the machining apparatus according to the third and fourth aspects described above, the grinding tool is preferably a grinding wheel or a belt grinding tool, and the grinding tool more preferably has a hydraulic motor for rotatably driving the grinding wheel or the grinding belt utilizing pressurized fluid flowing through a central portion of the spindle.

The grinding streaks formed by the grinding tool (or specifically, the abrasive grains thereof), if formed substantially along the outline shape of the join surface area, fail to establish the communication between the interior and the exterior of the container and, therefore, a highly hermetic join surface can be provided.

Further, by providing the relative feeding movement along the outline shape of the join surface area and moving the grinding tool and the join surface of the workpiece relatively to each other such that the direction of the rotation axis of the grinding tool substantially parallel to the join surface is substantially orthogonal to the direction of the relative feeding movement of the grinding tool, the streaks due to the grinding tool (or specifically, the abrasive grains thereof) are always formed along the outline shape, i.e. the outer periphery shape of the join surface area.

When a hydraulic motor is used as a driving unit for rotatably driving the grinding wheel or the grinding belt mounted on the spindle, pressured fluid such as compressed air supplied to the central portion of the spindle can be utilized as a power source. Therefore, the need of independently supplying power from an external source is eliminated, thereby making it unnecessary to conduct a manual mounting operation. As a result, an automatic tool changer can be used.

The term "grinding" herein generally refers to machining using abrasive grains and is defined to include not only machining using a tool such as a grinding stone having abrasive grains but also polishing using a liquid containing abrasive grains. Also, the term "join surface" is defined as a joining surface requiring sealability. Further, the term "grinding tool in rotation" is defined to include a tool such as a belt grinding tool with the grinding belt moved along an elliptical or an elongate circular path, and the term "the direction along the rotation axis" of the belt grinding tool is defined as a direction perpendicular to an elliptical or an elongate circular plane formed by the path of the grinding belt or the locus of the abrasive grains.

BRIEF DESCRIPTION OF THE DRAWINGS

The above and other objects, features and advantages of the present invention will be explained in detail below based on embodiments thereof with reference to the accompanying drawings, wherein.

BEST MODE FOR CARRYING OUT THE INVENTION

Figure 1:
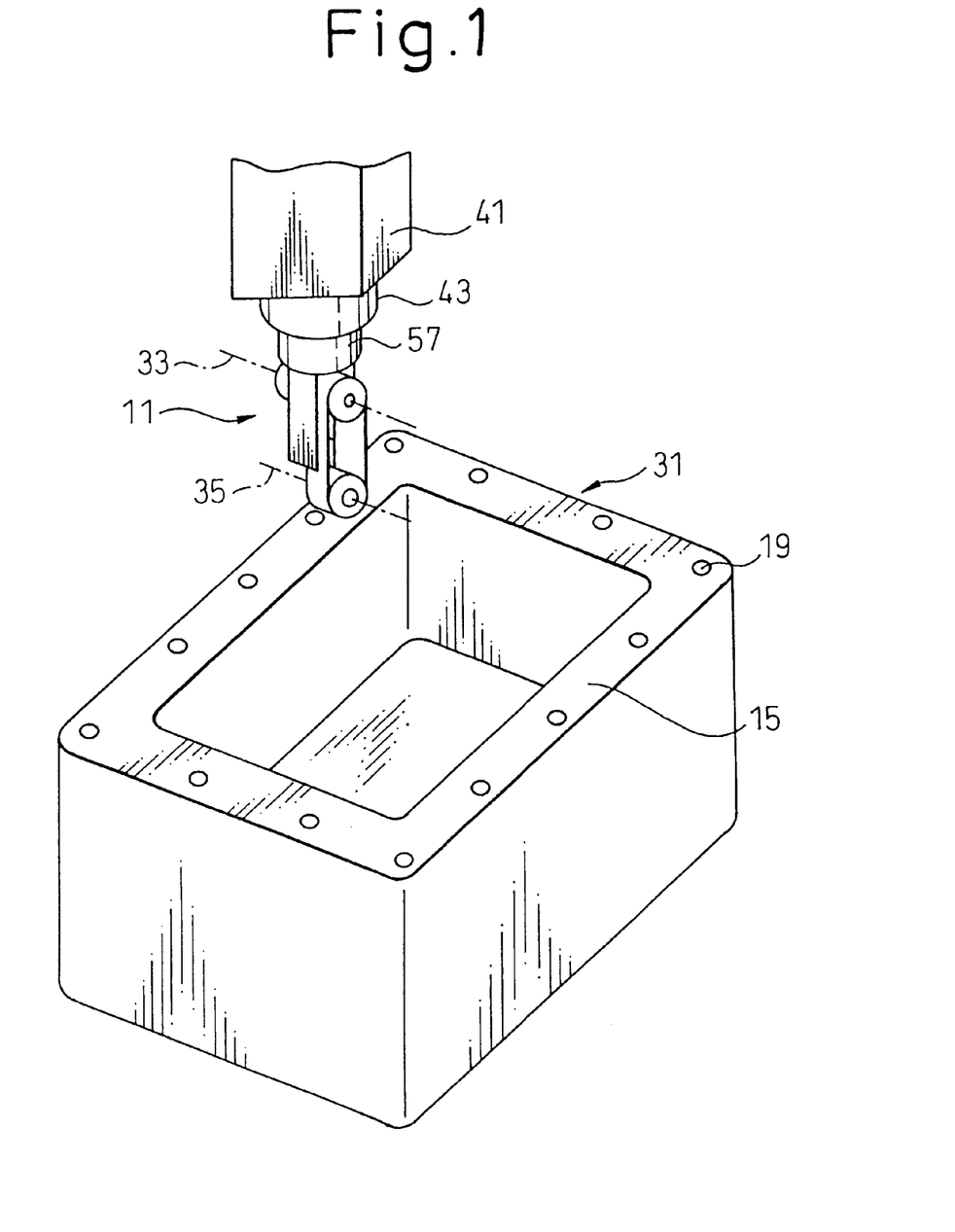
FIG. 1 is a partial perspective view of a machining apparatus for executing a method of machining a join surface according to one embodiment of the present invention.
Figure 2:
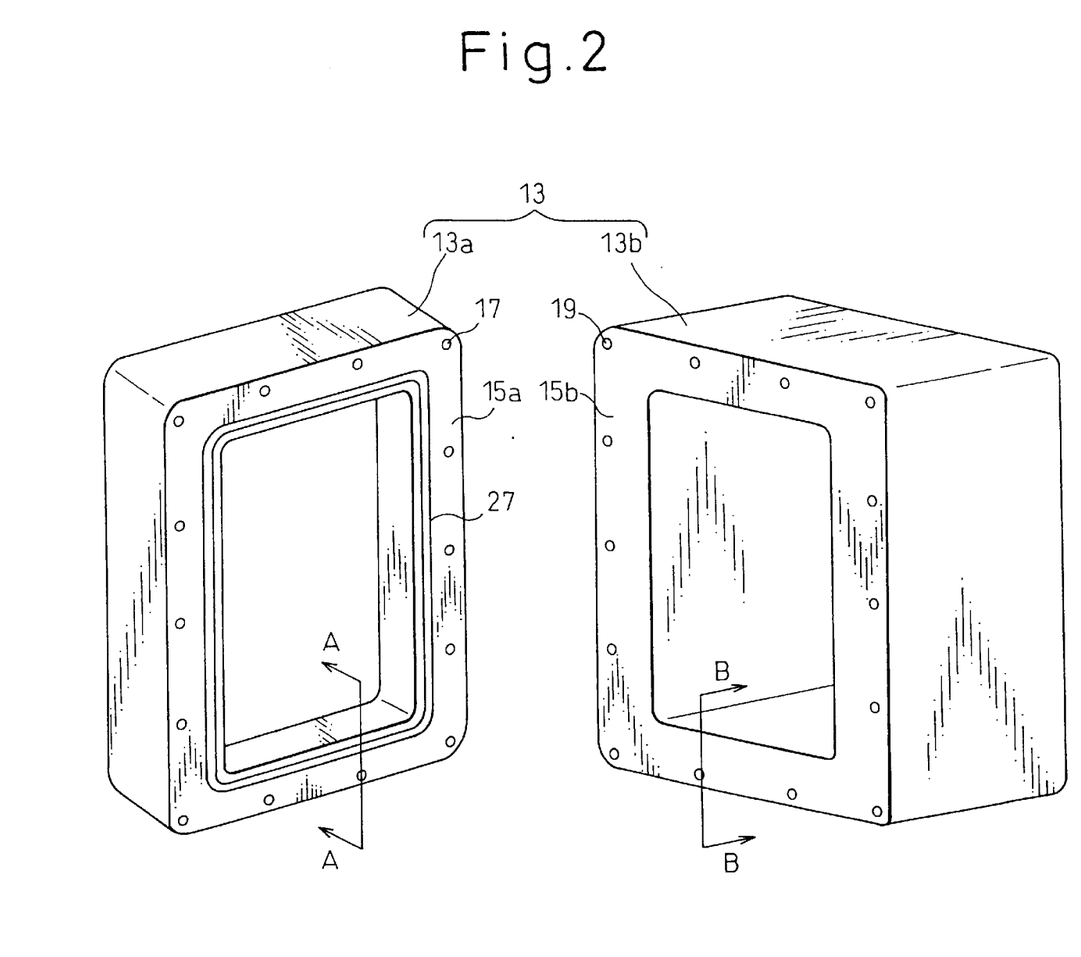
FIG. 2 is a perspective view showing an example of a container having a join surface requiring airtightness.

First, referring to FIG. 2, an example of a vacuum container required for fabricating a semiconductor or liquid crystal device is shown. This workpiece or vacuum container 13, which is divided into a lid portion 13a and a body portion 13b, has join surfaces 15a, 15b opposed to each other. In use, the join surfaces 15a, 15b of the lid portion 13a and the body portion 13b, respectively, are brought together with each other and fastened to each other by means of fastener such as bolts (not shown). In the vacuum container shown in FIG. 2, the lid portion 13a is formed with a plurality of through holes 17 formed along its outer periphery, and the body portion 13b is also formed with a plurality of threaded holes 19 at positions corresponding to the through holes 17. The lid portion 13a and the body portion 13b are fastened to each other by inserting bolts into the through holes 17 of the lid portion 13a to engage the threaded holes 19 of the body portion 13b.

The join surfaces 15a, 15b are normally machined by grinding them while rotating the grinding tool having abrasive grains in order to increase the hermetic property thereof. In the grinding process, however, fine streaks on the order of micrometer are formed undesirably on the join surfaces 15a, 15b as indicated by arrows 21, 23 in FIG. 4. Some of these streaks establish communication between the interior and the exterior of the vacuum container.

Figures 3A, 3B:
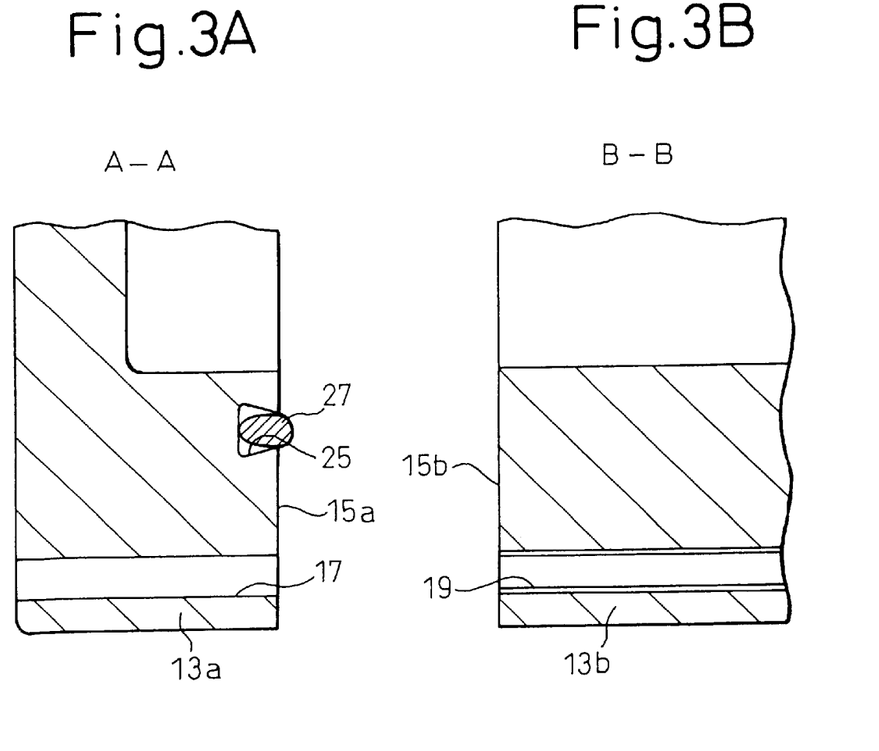
FIGS. 3A and 3B are sectional views taken along lines A—A and B—B, respectively, of the container shown in FIG. 2.

Therefore, a rubber seal such as an O-ring or a gasket is generally interposed between the lid portion 13a and the body portion 13b in order to secure airtightness between them. In the vacuum container 13 shown in FIG. 2, a groove 25 is formed along the outline shape, i.e. the outer periphery shape of the area of the join surface 15a of the lid portion 13a, as shown in FIG. 3A, and a seal element 27 such as an O-ring is arranged in the groove 25. Such a groove 25 is formed by use of a formed spring tool as described in Japanese Unexamined Patent Publication No. 60-155310. The join surface 15b of the body portion 13b opposed to the join surface 15a, on the other hand, is formed as a flat surface as shown in FIG. 3B. The seal element 27 arranged in the groove 25 of the lid portion 13a comes into contact with this flat surface (join surface 15b) and is deformed by the tightening force of the bolts thereby to isolate the interior and the exterior of the vacuum container 13 from each other.

However, the streaks 21, 23 formed on the join surface 15b of the body portion 13b in contact with the seal element 27 as an O-ring are of a size on the order of micrometer, and therefore are difficult to close up by the deformation of the seal element 27, with the undesirable result that the interior and the exterior of the vacuum container 13 communicate with each other, thereby causing a slight leakage.

Figure 4:
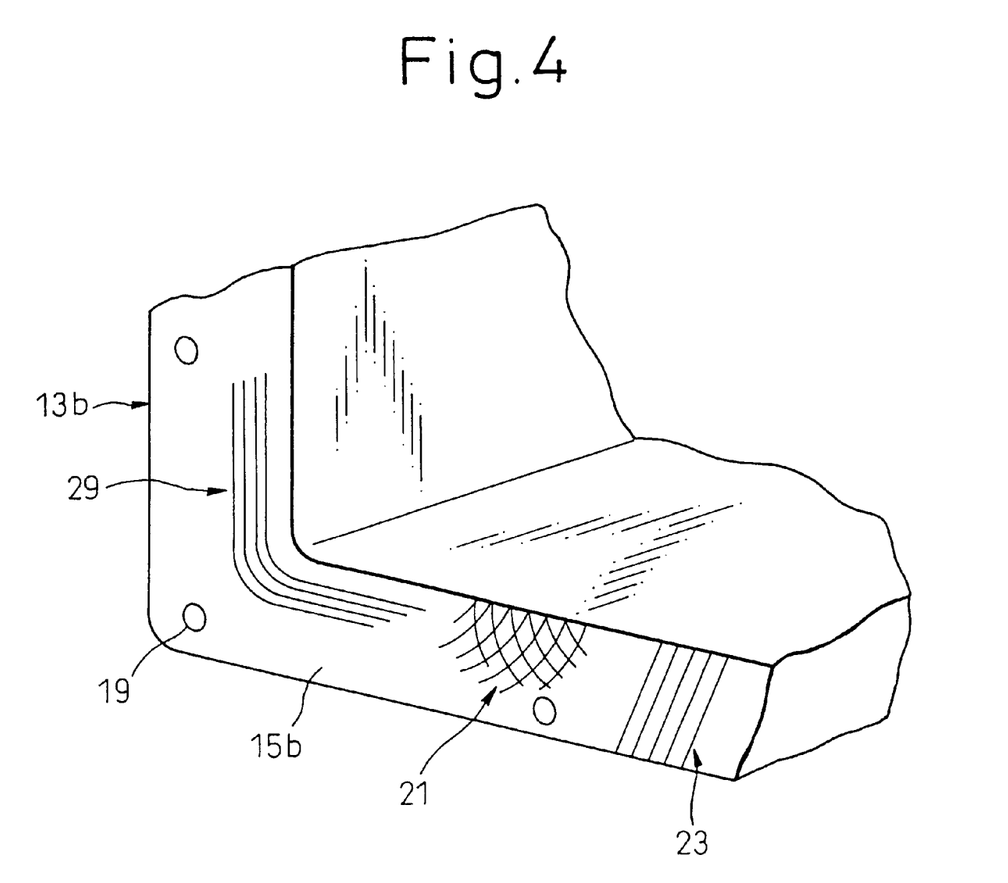
FIG. 4 is an enlarged view of the join surface.

The present applicant has discovered that the leakage described above is primarily caused by the fact that the fine streaks on the join surfaces due to the abrasive grains of the grinding tool 11 are not formed in the direction along the outline shape, i.e. the outer periphery shape of the join surface area. In view of this, in the method for machining the join surface according to the invention, the grinding process is carried out in such a manner that the streaks formed by the abrasive grains, like those indicated by the arrow 29 in FIG. 4, are formed substantially along the outline shapes of the areas of the join surfaces 15a, 15b of the workpiece such as the vacuum container 13.

Specifically, a grinding machine is used in which, when the grinding tool 11 in rotation is applied to the join surface 15 (15a, 15b) of the workpiece 31 (for example, the vacuum container 13) to be machined, the abrasive grains are not moved along a circle but along one substantially linear direction at least on the join surface 15 (15a, 15b). As a result, the streaks formed by the abrasive grains of the grinding tool 11 are always aligned in one substantially linear direction.

Further, the grinding tool 11 of the grinding machine and the workpiece 31 are fed relatively to each other substantially in the direction along the outline shape of the join surface area and controlled in such a manner that the direction of the rotation axes 33, 35 of the grinding tool 11 is substantially orthogonal to the direction of the relative feed. As a result, at the contact area between the grinding tool 11 and the workpiece 31, the direction of the velocity vector of the abrasive grains of the grinding tool 11 always coincides with the direction of relative feed between the grinding tool 11 and the workpiece 31, so that the streaks 29 are formed only in a direction substantially coincident with the direction of relative movement on the join surface 15 of the workpiece 31. In other words, the streaks 29 are formed only in the direction substantially along the outline shape of the area of the join surface 15 of the workpiece 31.

As a result, the streaks 21, 23 cannot be formed across the join surface 15, to provide communication between the two spaces separated by the workpiece 31, thereby remarkably improving the hermetic property of the join surface 15. Thus, the sealability can be secured even in the case where the join surfaces 15 of the workpiece 31 are brought into direct contact with each other without the seal element 27.

Next, an apparatus for executing the method of machining the join surface according to an embodiment of the invention will be explained with reference to FIGS. 5 to 7.

Figure 5:
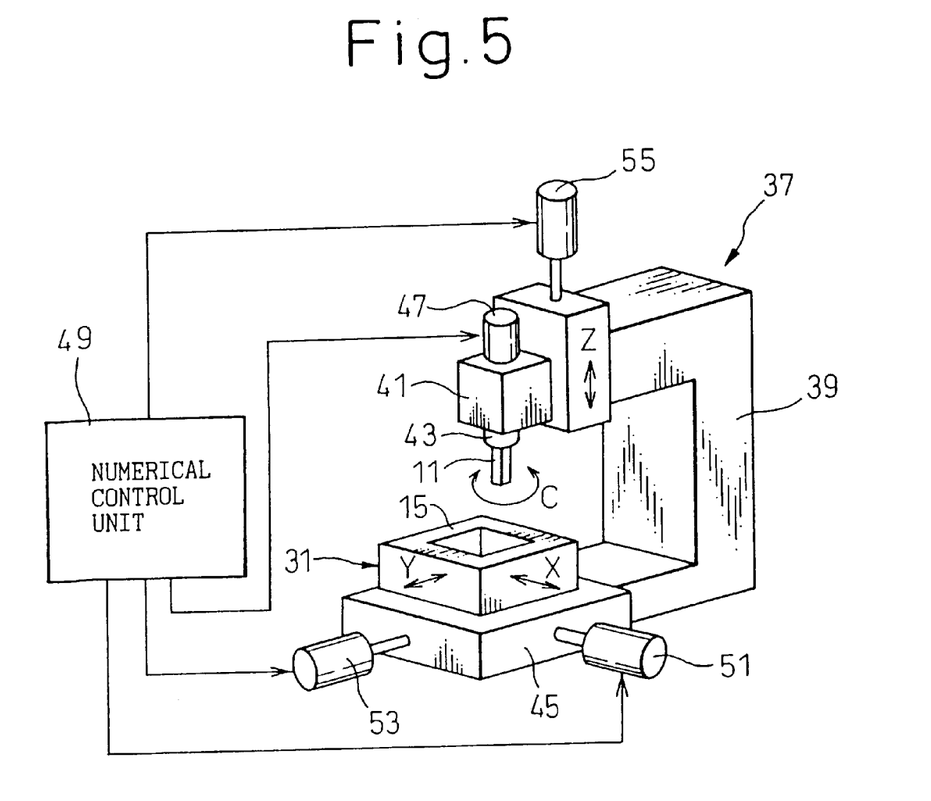
FIG. 5 is a diagram showing a general construction of the machining apparatus shown in FIG. 1.

In order to move the workpiece 31 and the grinding tool 11 relatively to each other along the outline shape of the join surface area, a machine tool 37 as shown in FIG. 5 is used. The machine tool 37 shown in FIG. 5 includes a column 39, a spindle head 41 supported at the upper part of the column 39, a spindle 43 with a machining tool removably mounted thereon, the machining tool being rotatably supported on the spindle head 41, a table 45 arranged at the lower part of the column 39 and having the workpiece 31 mounted thereon, a linear feed mechanism for moving the spindle 43 and the table 45 relatively to each other, a rotation mechanism 47 for moving the spindle 43 along the C-axis, a grinding tool 11 mounted on the spindle 43 as a machining tool, and a numerical control unit 49 for controlling the operation of the linear feed mechanism and the rotation mechanism 47. It should be noted that the movement along the C-axis is defined as the rotative motion about the Z-axis. In other words, in FIG. 5, the spindle 43 rotates along the C-axis. In FIG. 5, the machining tool is shown in simplified fashion.

The linear feed mechanism is arranged at the lower part of the table 45, and includes an X-axis feed mechanism 51 and a Y-axis feed mechanism 53 for moving the spindle 43 and the table 45 relatively to each other along the X- and Y-axes orthogonal to each other in a horizontal plane, and a Z-axis feed mechanism 55 arranged at the upper part of the column 39 for moving the spindle 43 and the table 45 relatively to each other along Z-axis orthogonal to the X- and Y-axes. The operation of each mechanism is controlled independently by the numerical control unit 49. Of course, the spindle 43 or the table 45 may be configured to move along all of the three orthogonal X-, Y- and Z-axes.

The rotation mechanism 47 is adapted to move within the range of at least ±180 degrees, and is not necessarily adapted to give high-speed continuous rotation to the spindle 43 as in ordinary machine tools.

The numerical control unit 49 provides the cut-in movement along the Z-axis and the relative movement along the X- and Y-axes in a direction substantially along the outline shape of the area of the join surface 15 between the grinding tool 11 and the join surface 15 of the workpiece 31. Further, the numerical control unit 49 controls the operation of the spindle 43 along the C-axis by the rotation mechanism 47, and thereby ensures that the direction of the rotation axes 33, 35 of the grinding tool 11 is substantially orthogonal to the direction of the relative movement.

By performing this control operation, it is possible to only form streaks 29 substantially along the outline shape of the area of the join surface 15 of the workpiece 31 using a well-known machine tool, which constitutes the feature of the method of machining the join surface according to the invention.

Figure 6:
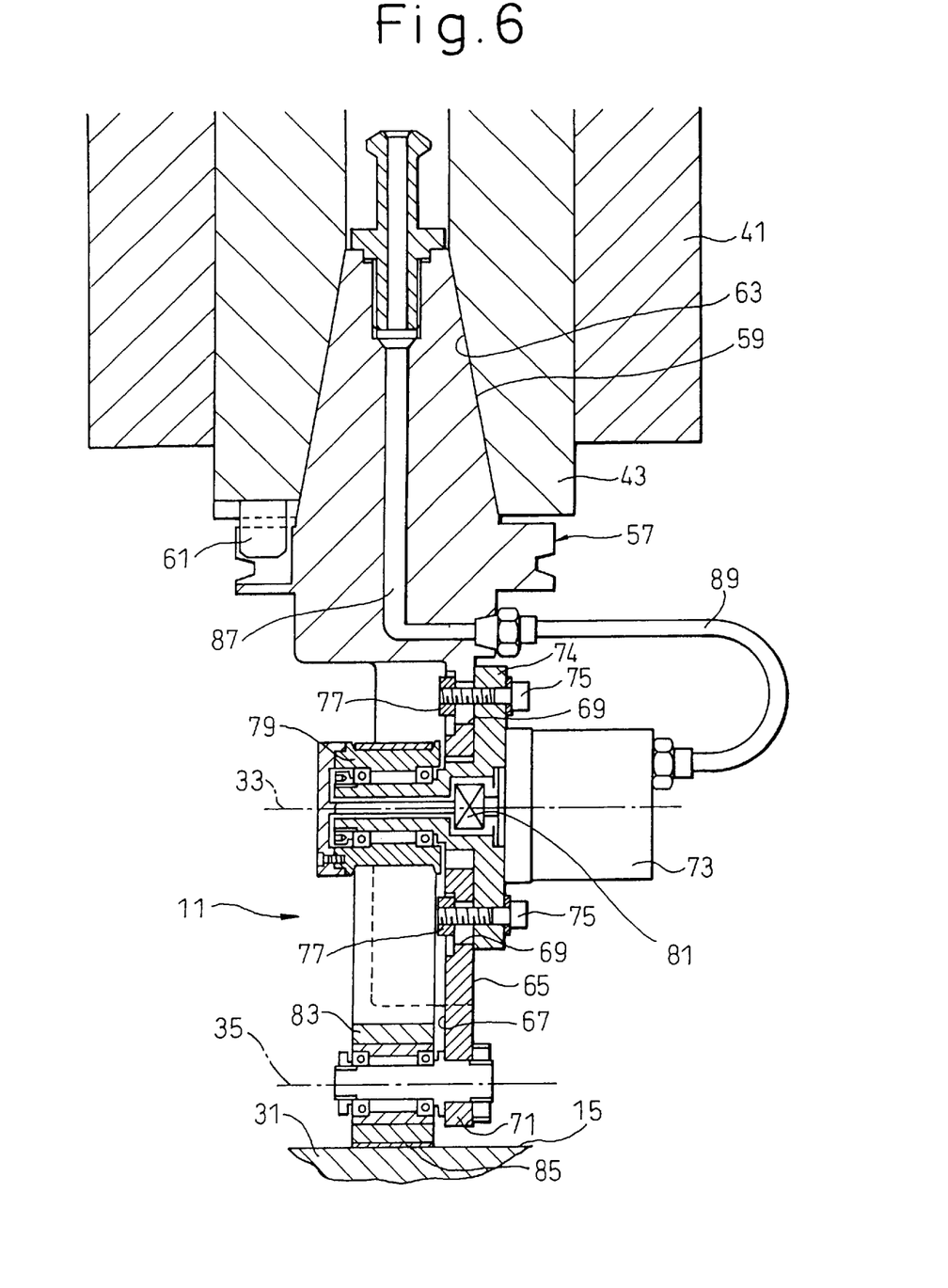
FIG. 6 is an enlarged sectional view of a tool mounted on a forward end of a spindle of the machining apparatus shown in FIG. 1.
Figure 7:
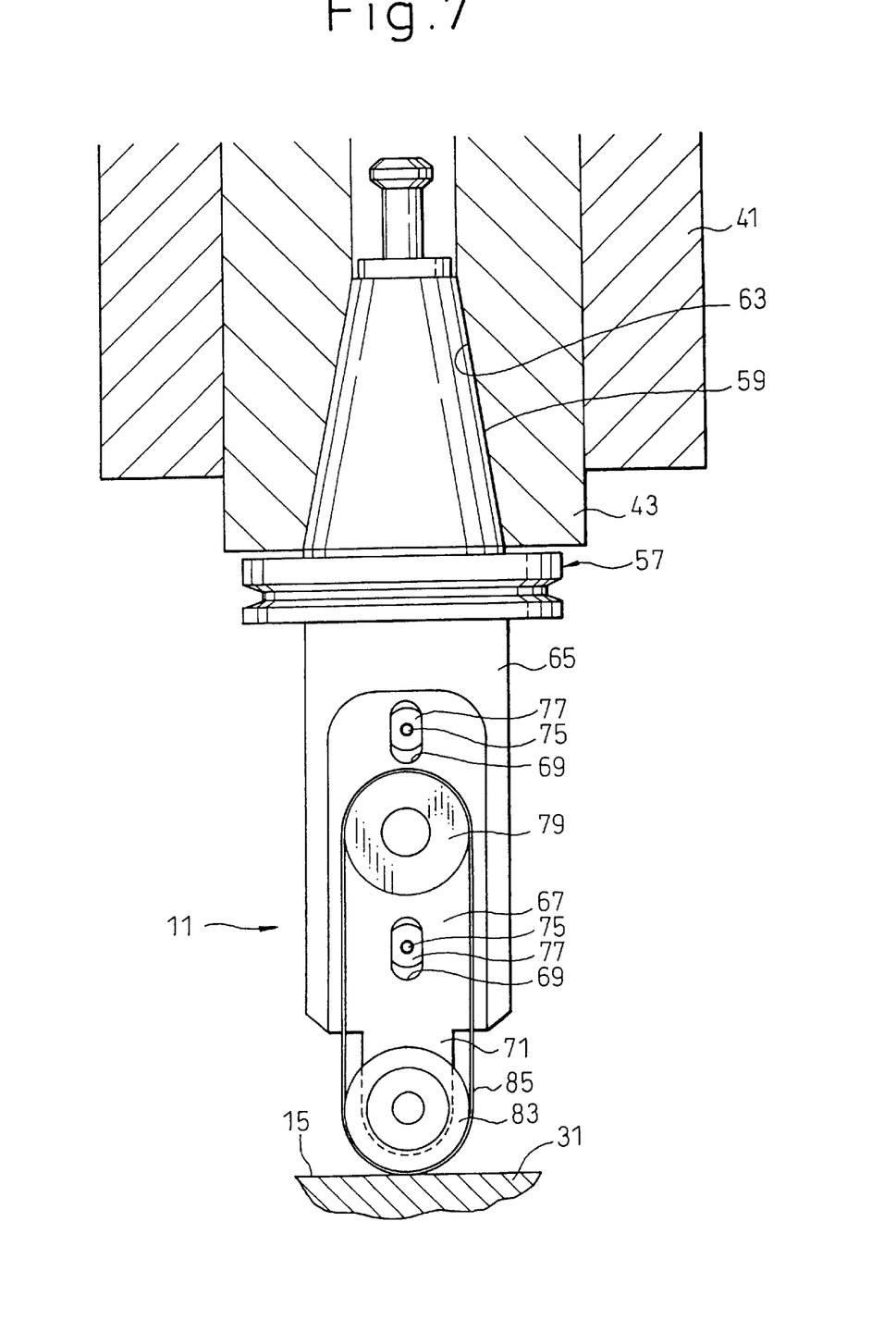
FIG. 7 is a side view of the tool shown in FIG. 6.

FIGS. 6 and 7 show in detail the machining tool, i.e. the grinding tool 11 shown in FIG. 5. Referring to FIGS. 6 and 7, the grinding tool 11 is mounted on the spindle 43 via a tool holder 57.

The tool holder 57 includes a taper shank 59 at an end portion thereof for coupling it to the spindle 43, and is coupled to a tapered hole 63 of the spindle 43 through a transmission key 61. The tool holder 57 is provided at the other end portion thereof with a bracket portion 65. The bracket portion 65 is formed with a recess 67 having a flat bottom surface at the center thereof. The wall at the lower end portion in the drawing of the recess 67 is removed and open. The bottom surface of the recess 67 is formed with two vertically elongate elliptical through holes 69, in a vertically spaced relationship. Further, a tab-shaped portion 71 extends from the open end portion of the recess 67 to a still lower side, i.e. toward the workpiece 31.

The surface of the bracket portion 65 positioned on the side opposed to the recess 67 is also flat, where an air motor 73, constituting a driving unit for the grinding tool 11, is mounted. The air motor 73 includes a flange 74. The mounting bolts 75, after being inserted through the flange 74 and the elongate through holes 69 of the bracket portion 65, are caused to engage the nuts 77, thereby fastening the air motor 73 to the bracket portion 65 of the tool holder 57. Therefore, the position of the air motor 73 mounted on the bracket portion 65 can be adjusted in the direction along the elongate through holes 69.

A drive pulley 79 is disposed at a position corresponding to the air motor 73 in the recess 67. The diameter of the drive pulley 79 is of course smaller than the horizontal width of the recess 67. This drive pulley 79 is coupled through a coupling 81 to the air motor 73 arranged on the other side of the bracket portion 65, and supplied with the driving power by the air motor 73. The drive pulley 79 is supported on the bracket portion 65 in such a position that the rotation axis 33 thereof is parallel to the workpiece 31. The bracket portion 65 further has a driven pulley 83 rotatably mounted thereon through a bearing or the like on the side away from the spindle 43 and in spaced relationship therewith.

A grinding belt 85 extends in a loop between the two pulleys 79, 83. Therefore, the grinding belt 85 is rotatably driven by the air motor 73 through the drive pulley 79, and moved in a circle around the drive pulley 79 and the driven pulley 83. It should be noted that the position of the air motor 73 or the drive pulley 79 can be adjusted vertically with respect to the fixed driven pulley 83 by way of the elongate through holes 69 as described above, so that the tension of the grinding belt 85 can be adjusted. Thus, the grinding belt 85 can be replaced easily. It is of course possible to fix the drive pulley 79 while making the driven pulley 83 adjustable in its vertical position.

In this application, in the case where such a grinding belt 85 is used as the grinding tool 11, it is assumed that the rotation axis of the grinding belt 85 is referred to as the rotation axes 33, 35 of the drive pulley 79 and the driven pulley 83. In other words, it means the direction perpendicular to the direction in which the abrasive grains on the grinding belt 85 move.

At the central portion of the tool holder 57, an air passage 87 extends in the longitudinal direction of the tool holder 57 from the end thereof nearer to the taper shank 59 toward the bracket portion 65. The air passage 87 is curved radially in the neighborhood of the bracket portion 65 and opened to the lateral surface of the tool holder 57. The air passage 87 is further connected to the air motor 73 through the hose 89. This configuration of the tool holder 57 and the use of the air motor 73 make it possible to drive the grinding tool 11 using the compressed air supplied through the central portion of the spindle 43. This leads to the advantage that an automatic tool changer can be used for changing the grinding tool 11.

A similar advantage is achieved also by using another type of hydraulic motor in place of the air motor 73 and another type of pressure fluid in place of compressed air.

By use of the grinding tool 11 as described above, a grinding machine, as used in the machining method described above, is realized in which the abrasive grains move only along one substantially linear direction but not in a circle at least on the join surface 15 when the grinding tool 11 in rotation is applied to the join surface 15 of the workpiece 31 (such as the vacuum container 13) to be machined. An apparatus having a similar function can be realized by using, as a grinding tool, a substantially cylindrical grinding wheel having a rotation axis extending horizontally or in parallel to the join surface 15 of the workpiece 31.

With the method and the apparatus for machining the join surface according to the invention, streaks are formed by the abrasive grains in a direction substantially along the outline shape of the join surface area as the result of grinding the join surface. Thus, the airtightness is improved for a join surface requiring airtightness between, for example, the lid portion and the body portion of the vacuum container.

What is claimed is:

1. A method for machining a join surface of a workpiece, comprising the steps of:

providing a grinding tool having a rotation axis substantially parallel to said join surface and adapted to rotate about the rotation axis;

applying said grinding tool to said join surface of said workpiece to be machined; and grinding said join surface of said workpiece by means of said grinding tool so as to form grinding streaks on said join surface in the direction substantially along the outline shape of the join surface area.

2. A method for machining a join surface of a workpiece, comprising the steps of:

providing a grinding tool having a rotation axis substantially parallel to said join surface and adapted to rotate about the rotation axis;

applying said grinding tool to said join surface of said workpiece to be machined; and grinding said join surface of said workpiece by providing the relative feeding movement in a direction substantially along the outline shape of the join surface area between said grinding tool and said workpiece while controlling the direction of said grinding tool or said workpiece such that the direction of the rotation axis of said grinding tool is substantially orthogonal to the direction of the relative feeding movement.

3. An apparatus for machining a join surface of a workpiece, comprising:

a spindle having a machining tool removably mounted thereon;

a table having said workpiece mounted thereon;

a linear feeding mechanism for moving said spindle and said table relatively to each other along the three orthogonal X-, Y- and Z-axes;

a rotation mechanism for moving said spindle and said table relative to each other in the direction along the C-axis as a rotative movement about the Z-axis;

a grinding tool having a rotation axis substantially parallel to said join surface and mounted as a machining tool on said spindle to rotate about said rotation axis; and a numerical control unit for controlling said linear feeding mechanism and said rotation mechanism such that said grinding tool forms the grinding streaks on said join surface in the direction substantially along the outline shape of the join surface area.

4. The apparatus according to claim 3, wherein said grinding tool comprises a belt grinding tool.

5. The apparatus according to claim 3, wherein said grinding tool has a hydraulic motor for rotatably driving a grinding belt utilizing pressured fluid flowing through a central portion of said spindle.

6. An apparatus for machining a join surface of a workpiece, comprising:

a spindle having a machining tool removably mounted thereon;

a table having said workpiece mounted thereon;

a linear feeding mechanism for moving said spindle and said table relatively to each other along three orthogonal X-, Y- and Z-axes;

a rotation mechanism for moving said spindle and said table relative to each other along the C-axis as a rotative movement about the Z-axis;

a grinding tool having a rotation axis substantially parallel to said join surface and mounted as a machining tool on said spindle to rotate about said rotation axis; and a numerical control unit for providing the cut-in movement along the Z-axis and the relative feeding movement along the X- and Y-axes in a direction substantially along the outline shape of the join surface area between said grinding tool and the workpiece while controlling the feeding movement along the C-axis such that the direction of the rotation axis of said grinding tool is substantially orthogonal to the direction of said relative feeding movement.

7. The apparatus according to claim 6, wherein said grinding tool comprises a belt grinding tool.

8. The apparatus according to claim 6, wherein said grinding tool has a hydraulic motor for rotatably driving a grinding belt utilizing pressurized fluid flowing through a central portion of said spindle.

* * * * *